July 14, 1931.  J. W. SMITH  1,815,014
GRINDER
Filed May 9, 1927    2 Sheets-Sheet 1
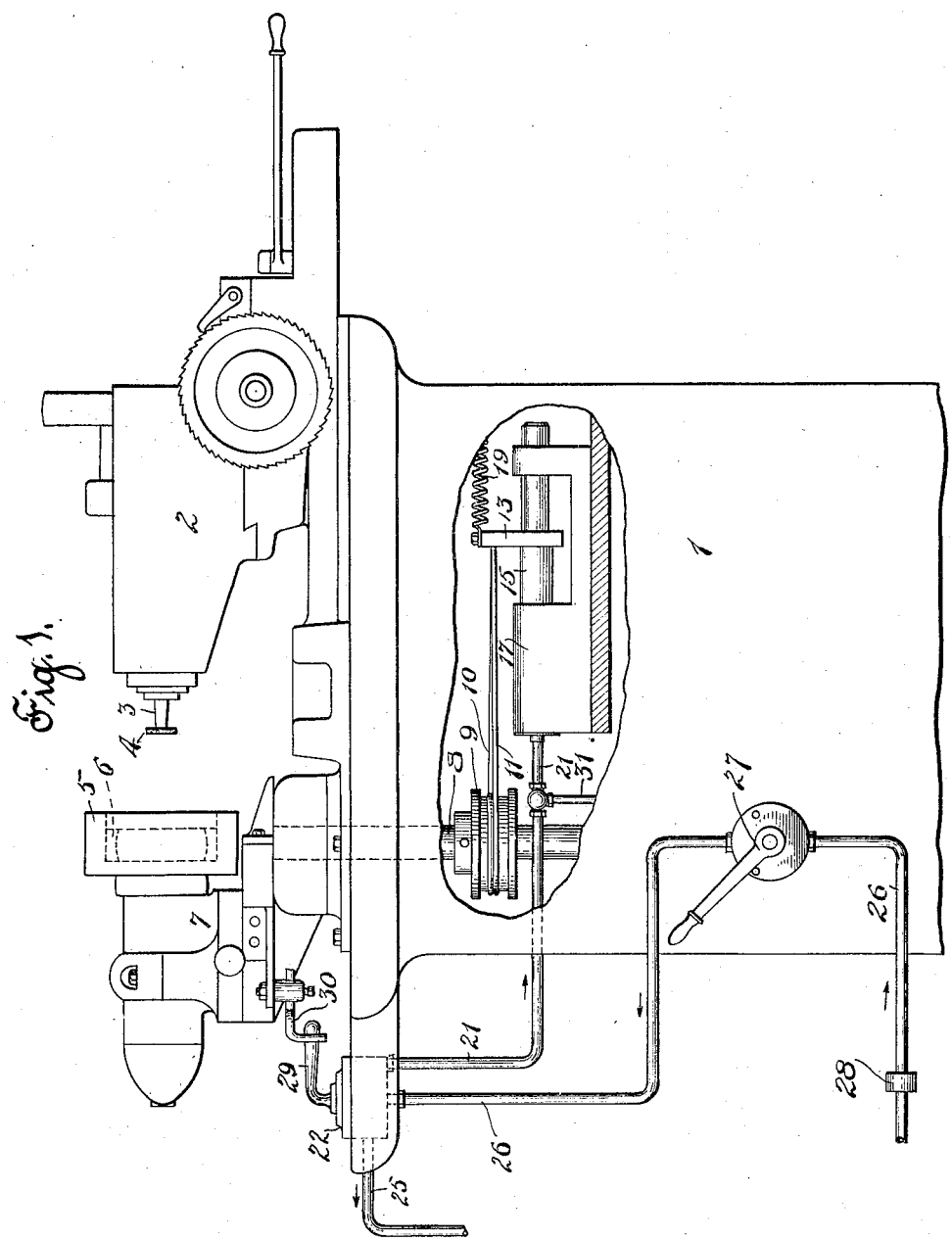
INVENTOR.
John W. Smith.
BY Mitchell & Bechtel
ATTORNEYS.

July 14, 1931.　　　J. W. SMITH　　　1,815,014
GRINDER
Filed May 9, 1927　　　2 Sheets-Sheet 2
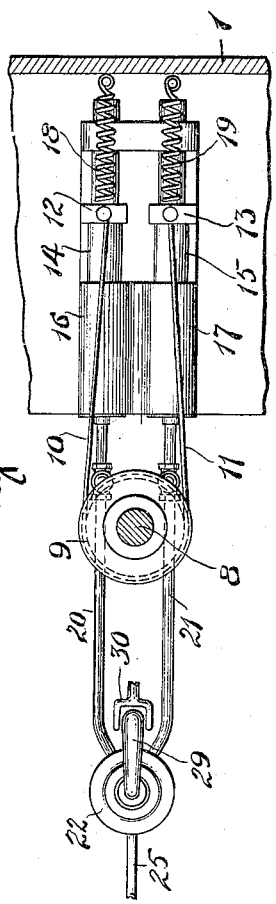
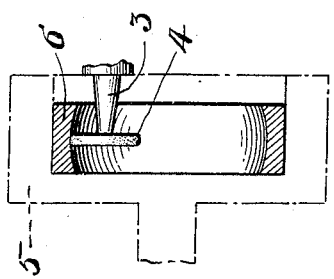
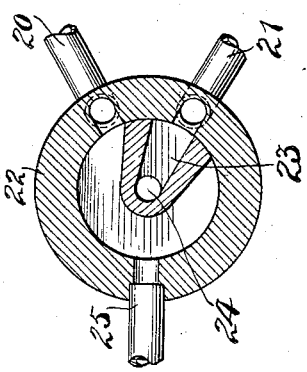
INVENTOR.
John W. Smith.
BY
ATTORNEYS.

Patented July 14, 1931

1,815,014

UNITED STATES PATENT OFFICE

JOHN W. SMITH, OF NEW BRITAIN, CONNECTICUT, ASSIGNOR TO THE FAFNIR BEARING COMPANY, OF NEW BRITAIN, CONNECTICUT, A CORPORATION OF CONNECTICUT

GRINDER

Application filed May 9, 1927. Serial No. 189,893.

This invention relates to certain new and useful improvements in grinding machines for bearings, particularly of the type in which rings are provided in which there are spherical ball races to be ground.

The object of the present invention is to provide a simple, effective, reliable and efficient machine, which will greatly relieve the amount of labor required and which will be largely automatic in action, the same being, by preference, hydraulically controlled.

In the drawings—

Fig. 1 is a side elevation, partly broken away, of the machine;

Fig. 2 is a plan view of the oscillating mechanism for the chuck head;

Fig. 3 is a cross section of the valve for controlling oscillation of the chuck head;

Fig. 4 is a horizontal cross section of the bearing ring with a plan view of the grinding wheel in operative position relatively thereto.

1 is the main frame. 2 is a head piece and may be of any suitable construction and mounted to be moved on top of the frame toward and from work position. 3 represents a grinder shaft that may be driven by any suitable means. 4 represents a grinder wheel, rotated by the shaft 3. 5 represents a chuck head in which a bearing ring, such as 6 (Fig. 4) may be suitably secured to be operated upon. The chuck 5 is mounted to rotate in a head piece 7 and may be rotated by any suitable means, at any desired speed. The particular means for rotating this head is immaterial to the invention.

The chuck head 7 is mounted to oscillate on a shaft 8, the axis of said shaft passing through the center of the spherical surface to be ground on the bearing race, so that when the grinding wheel is adjusted to stand in the position indicated in Fig. 4 and the chuck is oscillated, the grinding wheel will uniformly grind the raceway, the grinding wheel revolving at high speed while the chuck is revolved at a relatively low speed simultaneously with its oscillation, so that the grinding wheel will grind all parts of the raceway. The chuck head is fixed on the shaft 8 and the oscillation of the head is effected by the oscillation of the shaft, this, in the form shown, being under hydraulic control. Mounted on the shaft 8 is a pulley 9. Wound around this pulley is a suitable cord or belt, the two ends 10—11 of which are connected, respectively, to uprights 12—13 (see Fig. 2). These uprights 12—13 are respectively carried by pistons 14—15, which latter are respectively mounted in cylinders 16—17. 18—19 are springs which are respectively connected to the heads 12—13, both of said springs exerting a rearward pull tending to keep the belt ends taut. It follows that if the piston 15 is moved outwardly in the cylinder 17, it will pull on the belt end 11 and rotate the pulley 9 and shaft 8 in one direction, whereas, if the other piston 14 moves in a rearward direction, it will exert a pull on the belt end 10 and rotate the shaft 8 in the opposite direction. It is by this means that an oscillation of the shaft is effected.

Fluid pressure is preferably employed to move the pistons 14—15, and this is controlled, in the particular form shown in the drawings, as follows:

20—21 are two pipes connected, respectively, to the cylinders 16—17; the ends of said pipes being connected with a valve housing 22 at different points. Within this housing 22 is an oscillating switch valve 23, having an inlet passage 24. The housing 22 has an outlet or exhaust passage 25. The inlet passage 24 of the valve is connected with a pipe 26, controlled by a valve 27. The pipe 26 leads to any suitable source of fluid pressure and, if desired, may be provided with a relief or safety valve, which is conventionally illustrated at 28. Obviously, when the valve 23 stands in the position indicated in Fig. 3, oil pressure will flow through the pipe 26, past the valve 27 and into the valve 23, and thence it will go through the pipe 21 and into the cylinder 17, forcing the piston 15 outwardly so as to oscillate the shaft 8 in a counterclockwise direction as viewed in Fig. 2. During this period the cord or belt 10 will pull the piston 14 into the cylinder 16 and expel the fluid therein through the pipe 20 into the chamber in the valve casing 22, from whence it will escape through the outlet 25. If the valve 23 is switched to the position where it registers with the pipe 20, the foregoing operation will be reversed, the piston 14 being forced outwardly so as to turn the shaft 8 in a clockwise direction as viewed in Fig. 2. Thus, an oscillatory movement is imparted to the shaft 8 and consequently to the chuck 5.

The belt 11 is held tightly against the periphery of pulley 9 by means of the springs 18 and 19. As the belt is wrapped approximately one and one-half turns about the pulley, the frictional engagement between these two parts is ample to cause the head to oscillate amounts corresponding to movements of the pistons.

The means for controlling the operation of the valve 23 is important and comprises, in the form shown in the drawings, a lever 29 for the valve 23. The end of this lever fits into a yoke 30 carried by the rear end of the carrier for the chuck head 7. It follows that, as the chuck head 7 is oscillated, the valve 23 will be switched from one to the other of its operative positions previously described, so that the pistons 14—15 will be alternately reciprocated in their respective cylinders in opposite directions, to accomplish the oscillation of the shaft 8. The pipes 20—21 each have a relief line, one of which is indicated in Fig. 1, at 31.

The foregoing description is of a simple embodiment of means for the fluid control of the grinding operation of a grinding wheel on the raceway groove of a bearing ring. I am aware that in many respects the construction may be modified without departing from the spirit or scope of this invention.

By making the yoke 30 adjustable as shown the degree of oscillation may be varied to grind raceways of different sizes.

I claim:

A grinding machine for grinding spherical surfaces comprising a rotatable grinding wheel, a rotatable chuck mounted in a chuck head, a vertical shaft connected to said chuck head, the axis of said shaft passing through the center of the spherical surface to be ground, a cylinder within the base of said machine, a piston within said cylinder, means connecting said piston and said shaft, fluid pressure means for moving said piston, a valve for controlling said fluid pressure means, a pipe leading from said valve to said cylinder, a handle for operating said valve, said handle being positioned outside the frame of said machine so as to be accessible for hand operation, and an actuator carried by said chuck head and adapted to move said handle so that said chuck will be automatically oscillated.

JOHN W. SMITH.